(12) United States Patent
Dunn

(10) Patent No.: US 6,890,077 B2
(45) Date of Patent: May 10, 2005

(54) METHOD AND APPARATUS FOR HIGH RESOLUTION VIDEO IMAGE DISPLAY

(75) Inventor: Michael Joseph Dunn, Auburn, WA (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 10/306,333

(22) Filed: Nov. 27, 2002

(65) Prior Publication Data

US 2004/0102713 A1 May 27, 2004

(51) Int. Cl.⁷ .................................................. A61B 3/02
(52) U.S. Cl. ..................................................... 351/224
(58) Field of Search .............................. 351/201, 203, 351/209, 210, 224–246; 345/709, 7, 8, 9; 348/342, 115; 375/240.25; 382/103

(56) References Cited

U.S. PATENT DOCUMENTS

| | | | |
|---|---|---|---|
| 4,028,725 A | * 6/1977 | Lewis | 348/115 |
| 4,145,122 A | 3/1979 | Rinard et al. | 351/7 |
| 4,443,075 A | 4/1984 | Crane | 351/209 |
| 4,513,317 A | * 4/1985 | Ruoff, Jr. | 375/240.25 |
| 4,554,585 A | * 11/1985 | Carlson | 348/342 |
| 5,717,414 A | * 2/1998 | Bergsneider et al. | 345/8 |
| 5,726,916 A | 3/1998 | Smyth | 364/559 |
| 5,805,120 A | * 9/1998 | Yamada et al. | 345/7 |
| 6,106,119 A | 8/2000 | Edwards | 351/209 |
| 6,407,724 B2 | * 6/2002 | Waldern et al. | 345/8 |
| 2002/0141614 A1 | * 10/2002 | Lin | 382/103 |

OTHER PUBLICATIONS

"A real–time foveated multiresolution system for low–bandwidth video communication" by Geisler et al. In B. Rogowitz and T. Pappas (Eds.), Human Vision and Electron Imaging, SPIE Proceedings, 3299, pp. 1–13.*

"Variale–Resolution Displays for Visual Communication and Simulation" by Perry et al. The Society for Information Display, 30 pp. 420–423.*

* cited by examiner

Primary Examiner—George Manuel
(74) Attorney, Agent, or Firm—Harness Dickey & Pierce P.L.C.

(57) ABSTRACT

One aspect of the present invention is a method that includes displaying a first portion of an image in a peripheral vision field of a person; displaying a second portion of the image at a higher resolution than the first image portion in foveal vision field of the person; and adjusting the displayed first image portion and the displayed second image portion in accordance with movements of the person's line of sight over the image. In other aspects, the present invention provides an apparatus for displaying a tiered resolution image to a person, wherein the tiered image is adjusted in accordance with the person's eye movements.

28 Claims, 6 Drawing Sheets

METHOD AND APPARATUS FOR HIGH RESOLUTION VIDEO IMAGE DISPLAY

FIELD OF THE INVENTION

The present invention relates to methods and apparatus for video display of large, high-resolution scenes, and more particularly to methods and apparatus for fusing heterogeneous image fields.

BACKGROUND OF THE INVENTION

Modern land combat is expected to become dependent upon airborne surveillance of battlefields to obtain a synoptic picture of the combat theater, locate allied and enemy surface units, and identify surface objects, preferably on a real-time basis. The synoptic picture objective may require a single, integrated ground picture of up to 1 million square kilometers in extent, with surface/cultural features identifiable to an image resolution of 3 meters or less. Identification of surface targets may require scenes of 200 to 300 square kilometers in extent, with image resolution of 1 meter or less. Taken together, these requirements suggest an image display of between about $3 \times 10^8$ to about $1 \times 10^{11}$ pixels per frame, which is beyond the capability of current video display technology.

The display format for standard definition television (SDTV) is 480×640 or about $3 \times 10^5$ pixels. High definition television (HDTV) can have display formats with as many as 1,080×1,920 or about $2 \times 10^6$ pixels. Displays of larger images require mosaics of video monitor screens. For example, a 4×5 array of HDTV monitors could display approximately $4 \times 10^7$ pixels. Such mosaics have been constructed, but approximately 150 HDTV screens would be required to meet even the $3 \times 10^8$ pixel display requirement.

Electronic image "zooming" (magnification adjustment) can cover the dynamic range of image scale and lowest-level resolution capability, but not simultaneously in a single image. Magnified high-resolution viewing thus results in a loss of context of a wide-field background image.

High quality photographic emulsions can attain 1,000 line-pairs/millimeter (0.5 micron resolution, which is at or close to the diffraction limit of visible light). A 70 mm motion picture frame (approximately 70 mm×35 mm frame dimensions) would therefore be capable of presenting nearly $1 \times 10^{10}$ pixels, projected to the desired degree of magnification. Film-based systems require a process to expose the frame, develop and fix the image, and project the image using filtered light. Although camera systems and film stock developed for aerial reconnaissance can meet or exceed image display requirements for combat theaters, a time delay is associated with their use and there are elaborate processing requirements. Thus, photographic emulsion technology has not been used for real time image recognition technology.

SUMMARY OF THE INVENTION

The present invention, in some configurations, provides a method for displaying a video image to a person. The method includes displaying a first portion of an image in a peripheral vision field of a person; displaying a second portion of the image at a higher resolution than the first image portion in a foveal vision field of the person; and adjusting the displayed first image portion and the displayed second image portion in accordance with movements of the person's line of sight over the image.

The present invention provides, in some configurations, an apparatus for displaying an image to a person. The apparatus includes a first display screen configured to display a first, peripheral portion of an image; a second display screen configured to display a second, foveal portion of an image at a higher resolution than the first peripheral image portion; wherein said first display screen and said second display screen are configured to present the first, peripheral portion of the image and the second, foveal portion of the image as a merged image having tiered resolution to the person; and a processor configured to track eye movements of the person and alter the displayed first peripheral image portion and the displayed second foveal image portion in accordance with the tracked eye movements.

The present invention also provides, in some configurations, an apparatus for displaying a video image to a person. The apparatus is configured to display a first portion of an image in a peripheral vision field of a person; display a second portion of the image at a higher resolution than the first image portion in a foveal vision field of the person; and adjust the displayed first image portion and the displayed second image portion in accordance with movements of the person's line of sight over the image.

The present invention also provides in some configurations, an apparatus for displaying an image to a person. The apparatus includes eye tracking sensors and is configured to display a tiered resolution image to a person, wherein the tiered image is adjusted in accordance with the person's tracked eye movements.

It will be appreciated that various configurations of the present invention can provide images of a large scene at high resolution utilizing practical display technology by emulating the visual perception strategy of the human eye. In particular, a high resolution image portion is provided at and immediately around the operator's line of sight, allowing reduced resolution to be provided elsewhere. By providing reduced resolution elsewhere, processing and display requirements are kept relatively modest. On the other hand, a person viewing the display is able to perceive a large scale image as though it were presented entirely in high resolution, because a high resolution portion tracking the person's foveal field of view is provided.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Various configurations of the present invention emulate the visual perception strategy of the human eye, in which a large, low-resolution image (peripheral visual field) surrounds a small, high-resolution image (foveal visual field). The fundamental principle of this peripheral/foveal approach to vision is that high-resolution imagery is needed only near the visual system's line-of-sight, i.e., it is only necessary to see clearly in the direction in which one is looking.

Therefore, in some configurations, a large, low-resolution scene is displayed in a 4:5 aspect ratio format utilizing a conventional cathode ray tube (CRT) or liquid crystal display (LCD) technology capable of generating HDTV-like displays of 1,080×1,350 pixels ($1.458×10^6$ total pixels). These ratios and numbers of pixels are not critical and are merely intended to provide a specific example of a physical configuration that is well within the capability of current CRT and LCD manufacturing technology. The aspect ratio and pixel numbers may vary in other configurations.

Figure 1:
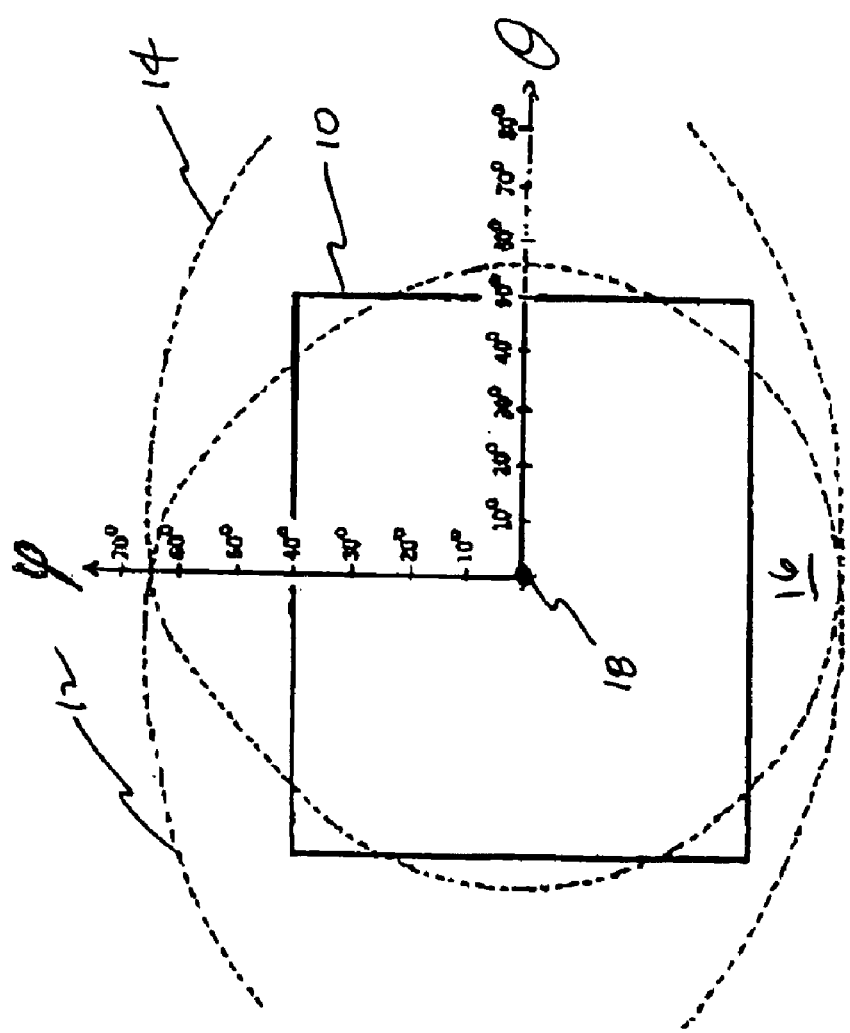
FIG. 1 is a representation of the relationship of display screen formats to the human visual field.

For example, and referring to FIG. 1, a representation of a 4:5 aspect ratio screen 10 is shown superimposed on representations of a normal human visual field 12 and 14, for the left and the right eyes, respectively. The fovea line-of-sight 18 is shown directed at the center of screen 10 and is the origin of the $\theta$ and $\phi$ axes shown in FIG. 1. The angles marked along the $\theta$ and $\phi$ axes indicate eyesight angles from fovea line-of-sight 18. An image (not shown in FIG. 1) that fits within display screen 10 placed a distance from the eye at which screen 10 subtends an 80°×100°field fits easily within a zone of binocular vision 16 (i.e., in a region that is within both visual fields 12 and 14), except possibly for small regions at the corners. At this distance, an image pixel of a 1,080×1,350 pixel screen subtends an angular dimension of 0.074° (1.293 mrad), whereas normal 20/20 visual acuity is one minute of arc (1' or 0.291 mrad).

Figure 2:
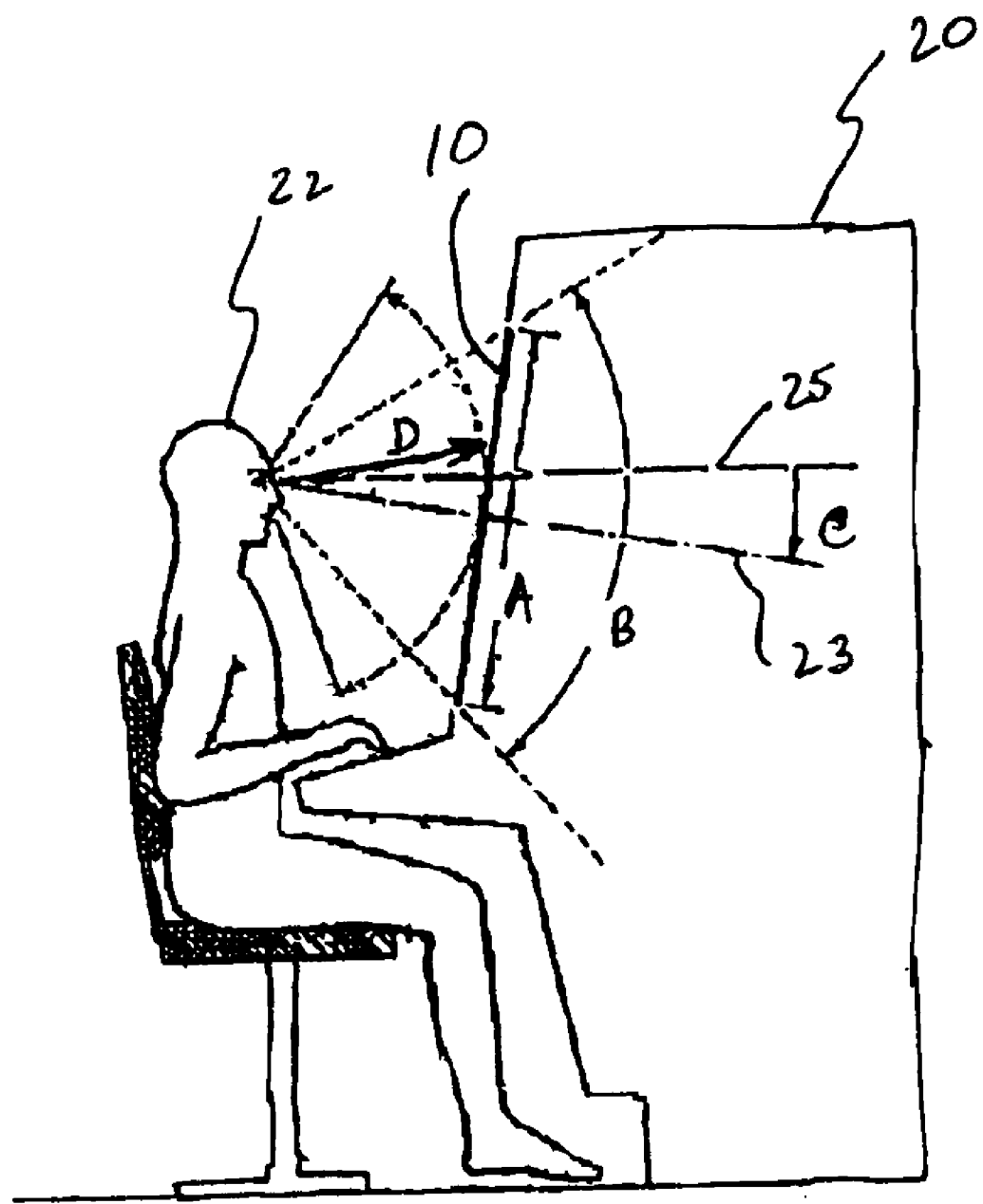
FIG. 2 is a drawing of a console display of various configurations of the present invention.

Referring to FIG. 2, some configurations of the present invention provide a console display 20 having a CRT, liquid crystal, or other display or image screen 10. An operator 22 seated at console display 20 is positioned such that his or her visual fields 12, 14, and 16 relate to the console display screen 10 as described with respect to FIG. 1. Dimension A represents, a height of the screen 10, which in the present configuration is approximately 64 centimeters. Dimension B represents an angle of the field of view subtended by the display screen 10, which in the present configuration is approximately 80°. Dimension C represents an angle of depression of the operator's line of sight 23 below a horizontal 25 local to the operator 22. Comfortable posture can be facilitated where the operator maintains angle C at about 10° below local horizontal 25. It should be noted that the foregoing dimensions are preferred but not critical and may vary in different configurations.

As shown in FIG. 2, the display screen 10 presents a real image, i.e., one in which light energy is physically emitted from the image plane, as from a CRT or backlit LCD screen 10, or from a ground glass screen of a projector in some configurations. In the embodiment shown in FIG. 2, a minimum comfortable distance D of display screen 10 from the eyes of operator 22 is about 38 cm (15 in), allowing screen dimensions of 64 cm×80 cm (25 in by 31.5 in). These dimensions are comparable to those of a so-called "40 inch" (101.6 cm) diagonal TV screen.

In some configurations, the display screen 10 presents a virtual image, i.e., one in which light from the image does not actually emanate from the apparent physical position of the image. A virtual image could be projected through an optical lens system, for example, as a collimated projection from an off-axis paraboloidal reflector or from a Fresnel refractor element. In embodiments in which a virtual image is presented, the virtual image could be, for example, projected so as to apparently rest at infinity. A focal distance of a virtual image could alternatively be less than infinity, as further described below.

Figure 3:
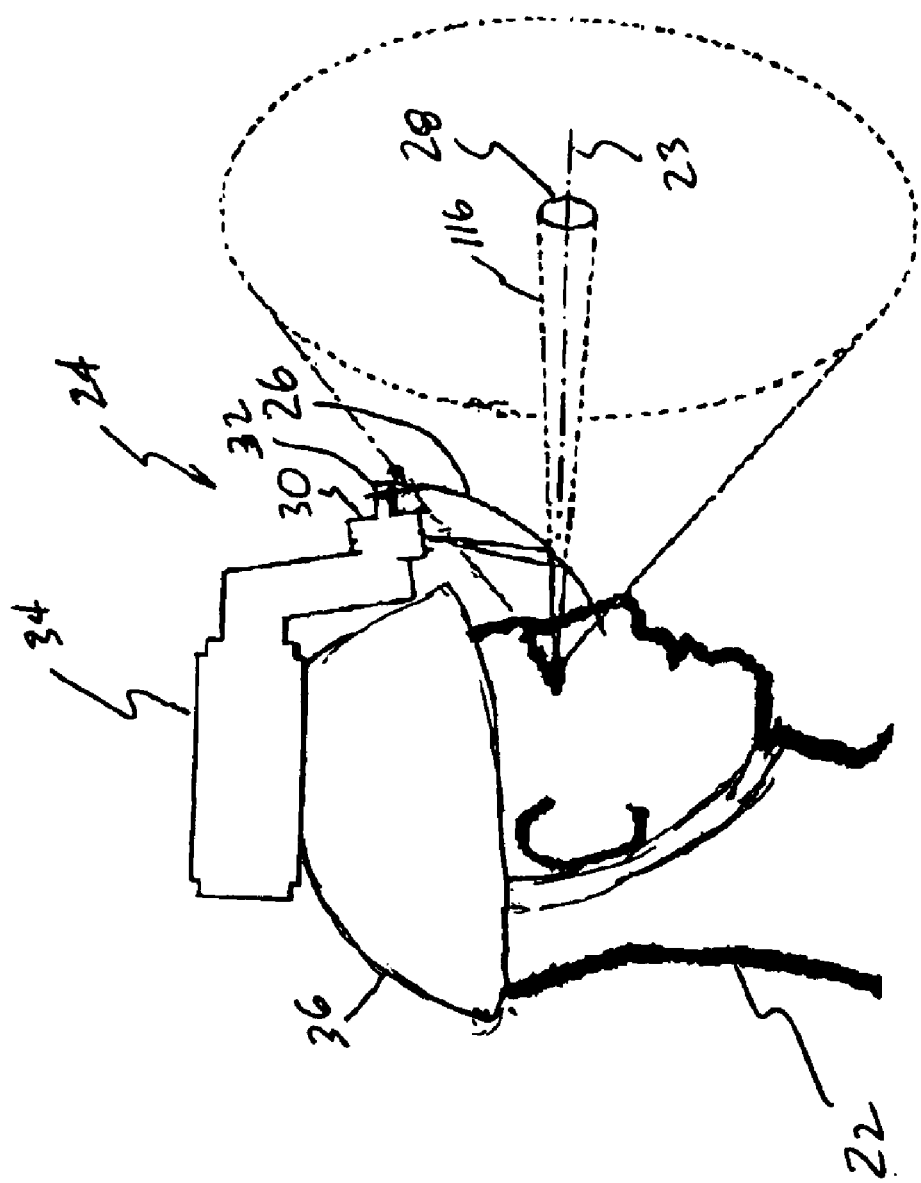
FIG. 3 is a drawing of a virtual display screen assembly of various configurations of the present invention.

Referring to FIG. 3, a display screen assembly 24 is used in conjunction with console display 20. The assembly 24 is configured to display a high-resolution image portion 28 in a foveal vision field of the operator 22. A display screen 26 displays a virtual image, i.e. in which light energy is not actually emitted from the apparent physical position 28 of the image. Display screen 26 is held in fixed relationship to projector 30 by one or more mounting elements 32.

In some configurations the high-resolution field is realized as a virtual image projection from a separate 480×640 pixel SDTV-type display, admitted to the eyes via individual, headwear-mounted beam-splitters. For example, a partly reflective ellipsoidal reflection element 26 is used in conjunction with projector 30, which, together with electronics 34, are mounted on a helmet 36 that is configured to be worn on the head of observer or operator 22. The combination of projector 30 and a beam-splitting reflection element 26 provide the virtual image projection. Other configurations of the present invention rely upon optical configurations of prisms or other beam-splitting optical elements rather than reflective elements to produce a virtual image projection. In some configurations, goggles, masks, or other types of headwear could be used instead of or in addition to the helmet 36. In other configurations, the display assembly 24 could be separate from the operator 22. For example, the display assembly 24 could be integrated with the console display 20 or could stand apart from display 20. In such configurations, the operator 22 could utilize an eyepiece of the assembly 24 to view the high-resolution image portion.

Figure 4:
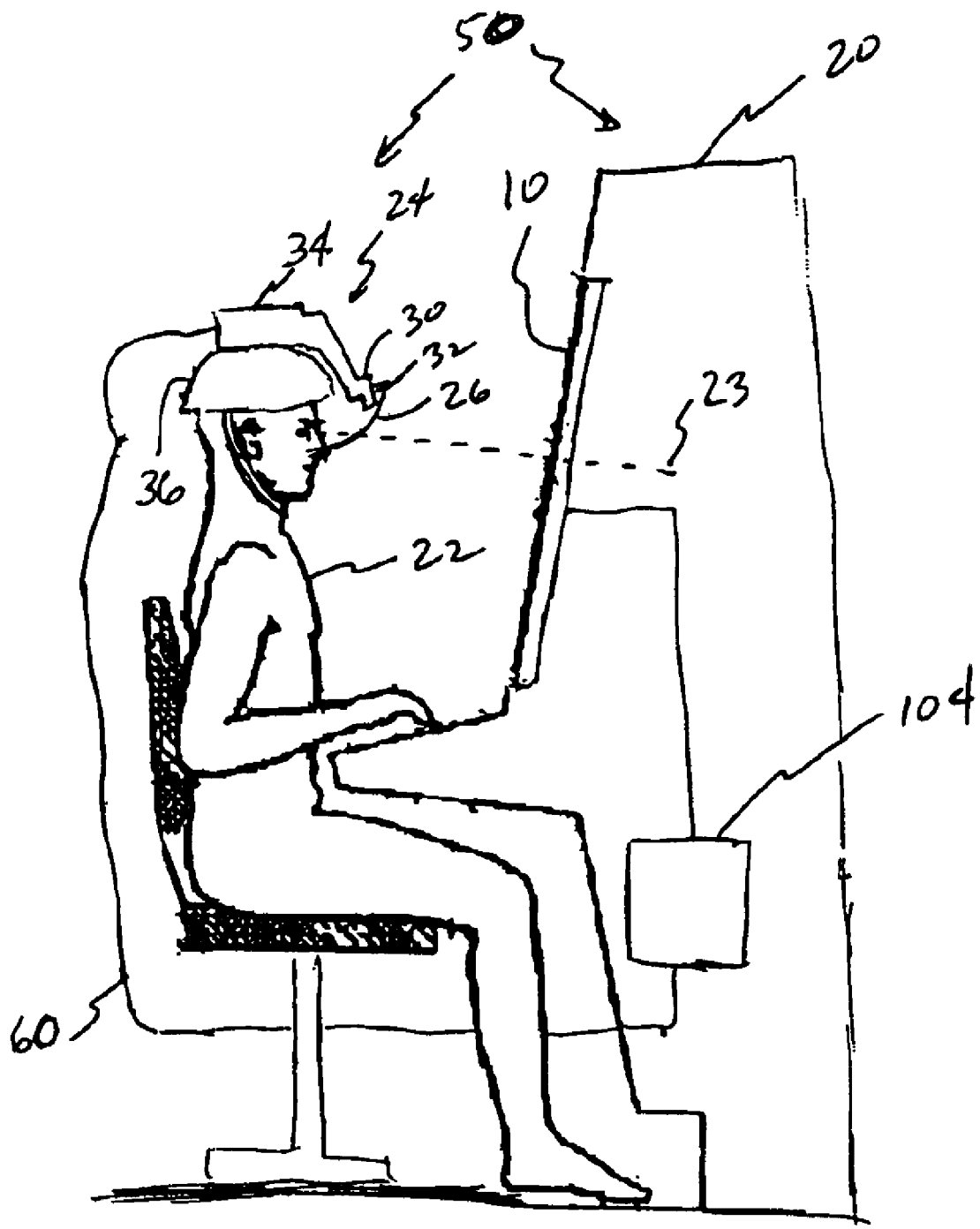
FIG. 4 is a drawing of a configuration of the present invention utilizing the console display of FIG. 2 and the virtual screen assembly of FIG. 3.

In some configurations and referring to FIG. 4, an apparatus 50 for high resolution image display comprises a combination of console display 20 and virtual display screen assembly 24. To use apparatus 50, operator 22 sits in front of console display 20 while wearing display screen assembly 24. Beam splitting screen 26 is configured to be worn in front of at least one of the eyes of person 22 when the person is viewing display screen 10. A sensor processor 104 controls the images displayed on image screen 10 and virtual display screen 26 in accordance with detected eye movements of operator 22. Images for virtual display screen 26 and eye movement data are communicated between display screen electronics 34 on helmet 36 and sensor processor 104 via a suitable wired or wireless bi-directional data path 60.

Figure 5:
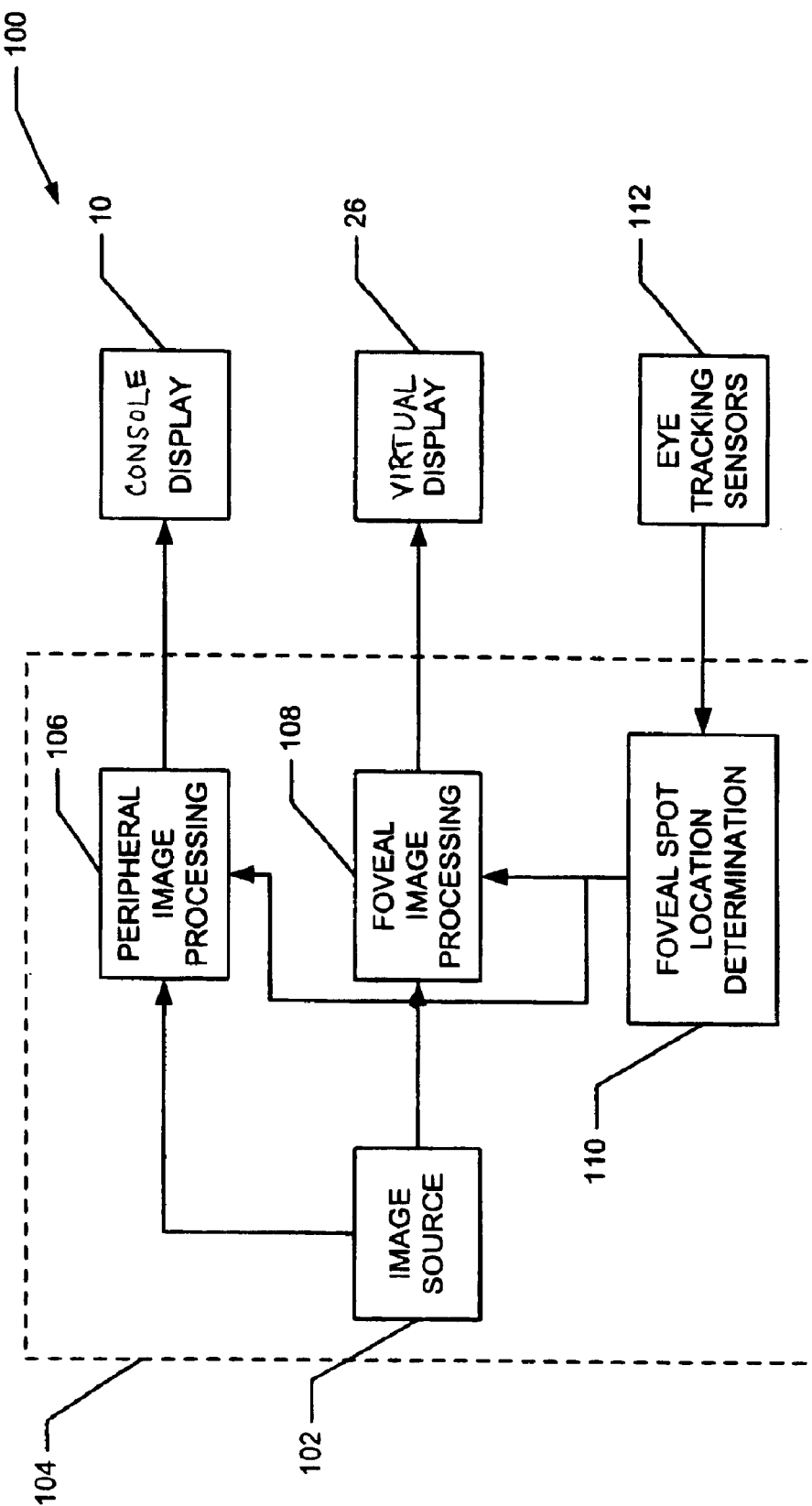
FIG. 5 is a block diagram of a sensor processor suitable for use in various configurations of the present invention.
Figure 6:
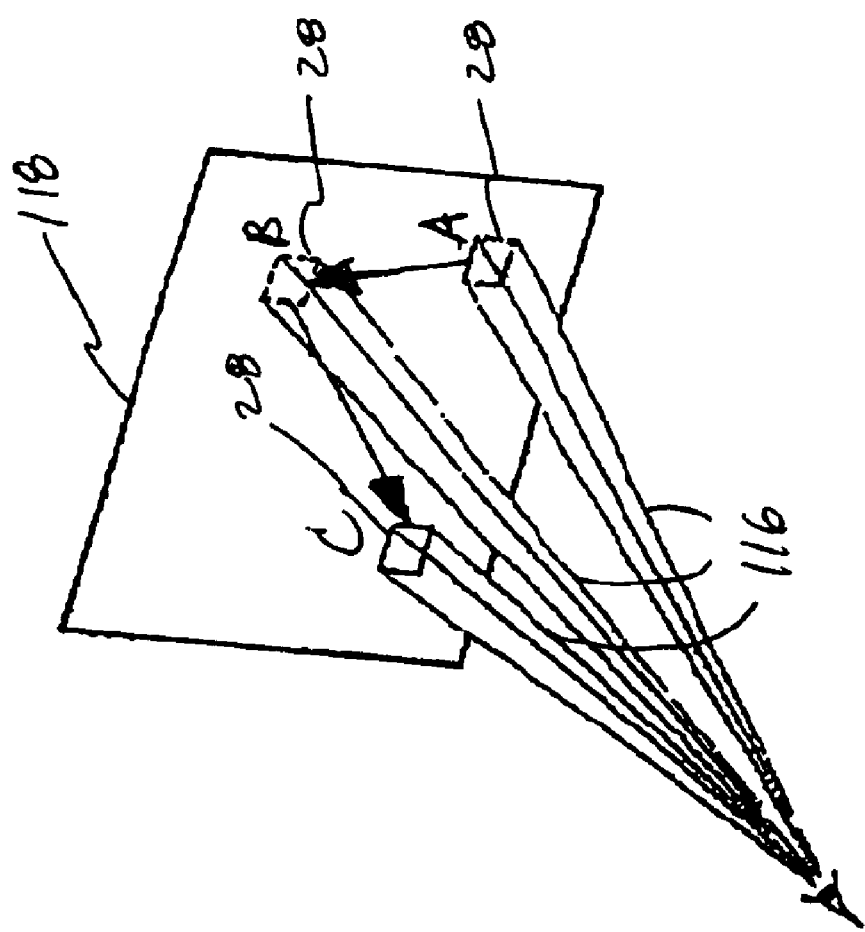
FIG. 6 is a representation of a person's foveal field of view as it moves about a displayed image.

In various configurations, and referring to FIGS. 4, 5, and 6, an image 118 viewed by operator 22 is a derivative of a fully data-processed image that is stored in a memory 102 of sensor processor 104, and which comprises a total scene content of about $35.5×10^6$ pixels (80°×100° image size divided by 0.015°×0.015° pixel size). It should be noted, however, that the number of pixels and size of the image may vary depending upon the image being viewed and the pixel size, and the pixel size may vary somewhat in different configurations. Image processing to enhance scene feature recognition or object identification is also provided in some configurations before the scene is actually displayed to an operator. (Additional image processing components are not shown in FIG. 5, but image enhancement may be done by additional processing in sensor processor 104 or in another processor external to sensor processor 104 prior to storage of data in memory 102.) Tiered image perception is utilized, so that an operator 22 views a low-resolution background scene in display 10 at the same time that a high resolution image subframe is presented to the operator's line of sight 23 in display 26 as the operator's foveal vision 116 moves across an image 118 from point A to point B to point C.

A coarse image 118 of the entire scene is projected, at low resolution, on display 10 to subtend about 80°×100° of the operator's field of binocular vision. Within that scene, the operator's line of sight (LOS) 23 is directed at will, projecting to some point in the screen image, such as A, B, or C. The exact direction of line of sight 23 is measured by eye tracking sensors 112, which in some configurations comprise headwear optics (not shown in FIG. 4), reflection of low-level light beams from the operator's corneas and inertial, interferometric, or mechanical measurement of helmet orientation. Sensing systems for measuring the operator's line of sight are already known, for example, in helmet-mounted, visually-cued, fire direction systems used in attack helicopters, and any suitable sensors for tracking the operator's line of sight may be used. This tracking information is provided to sensor processor 104, where a foveal spot location determination module 110 determines the foveal location in image space coordinates.

Peripheral image processing module 106 generates a vacancy in the coarse image display, centered on the LOS fixation point. In some configurations, this vacancy corresponds to a foveal image field of 7.2°×9° in the coarse image display. Simultaneously, foveal image processing module 108 generates a fine image display that "fills-in" that vacancy with a corresponding high resolution image on virtual display 26, so that operator 22 sees, in his or her foveal vision field 116, a high-resolution image. Because the operator is viewing both images through a beam-splitting screen 26, the low resolution image (with the foveal image field vacancy) presented on display 10 will fuse at the boundaries of the vacancy with the high resolution fill-in image presented on virtual display 26 to form one perceived image. In this manner, the operator's fovea is presented an image at a resolution matched to his normal acuity, and a low-resolution remainder of the scene is presented to his peripheral vision.

The apparatus 50 monitors and controls the apparent focal distance of a virtual image, so that the operator may simultaneously focus on images displayed by both displays 10 and 26. For example, where the console display 20 presents a real image, the image surface 10 is at physical distance D (shown in FIG. 2) from the operator 22, who focuses his or her eyes at that distance. In such event, the virtual image displayed by the display 26 is projected so as to be apparent at the distance D. In configurations in which virtual images are displayed by both displays 10 and 26, apparatus 50 monitors and controls apparent focal distances of both virtual images, so that the images are projected to the same focal distance.

The foveal visual field is approximately 125 mrad (7.16°) in angular diameter. (The radius of the parafovea is about 1.25 mm, and the distance from the fovea to the nodal point of the eye is about 20 mm, resulting in an angular subtense of 0.0625 radian.) Thus, some configurations of the present invention magnify high resolution image 28 to produce an image 28 that is, for example, 7.2°×9° of the visual field (9% of the coarse image subtense, per axis). The resultant resolution is 0.015° (0.26 mrad), which compares with normal human acuity at one minute of arc (0.0166° or 0.29 mrad).

In some configurations in which display 10 displays a virtual image, a high resolution image displayed by display 26 and the virtual image displayed by display 10 can be projected to appear at "infinity" (emmetropic vision), as is image 28 shown in FIG. 3. Producing images appearing to be situated at "infinity" can result in a condition in which eyes of observer 22 are "emmetropic," i.e., the lens of the eye is relaxed, as would be the case for far-distance vision. Displaying the images at infinity is preferred in some configurations and can be advantageous in superpositioning visual fields, facilitating image fusion and reducing eye strain by not requiring an operator's eyes to focus on images at apparent disparate distances.

As operator 22 changes the direction of his viewing, the fixation point of line of sight 23 moves to new locations within the presented scene 118. As the fixation point moves, foveal spot location determination module processor 110 will determine this location. From this determination, peripheral image processing module 106 will locate an appropriate image vacancy in coarse display 10 and foveal image processing module 108 will present an appropriate high-resolution fill image in the helmet-mounted virtual display 26. At any given moment, wherever operator 22 is directing his gaze, he will experience high resolution foveal vision.

Eye tracking rates are not demanding, in that normal gradual eye movements occur at a maximum rate of about 30°/second (about 0.5 radian/second). For an image refresh rate of 60 Hz or greater, it is feasible to sustain the illusion of smoothly-evolving image content. Rapid eye directional adjustments known as saccades can be as rapid as 500°/second, but physiological evidence indicates that the vision process is automatically interrupted during this movement.

In some configurations of the present invention, boundaries between the foveal image field and the peripheral image field are apodized (i.e., smoothly varied) to facilitate image fusion by moderating image features (e.g., lines in the image or high contrast ratios across image elements) that might be noticeable even though occurring in the zone of peripheral vision.

Thus, configurations of the present invention display a video image to a person 22 by displaying a first portion 118 (i.e., a first, peripheral portion) of an image in a peripheral vision field of person 22 and a second portion 28 (i.e., a second, foveal portion) of the image at a higher resolution than the first image portion 118 in a foveal vision field 116 of person 22. The displayed first image portion 118 and the displayed second image portion 28 are adjusted in accordance with movements of the person's line of sight 23 over the image, which itself is a merging of first image portion 118 and second image portion 28 in the person's field of view. First image portion 118 is displayed on a first image screen 10, whereas second image portion 28 is displayed on a second image screen 26. Where second image screen 26 is or comprises a beam splitter, the person 22 can see an image appearing on first image screen 10 even though it is behind second image screen 26 in his field of view, and so that second image portion 28 is reflected from second image screen 26 into his foveal field of view. Beam splitter 26 is mounted 32 on a helmet or other headwear 36 that is configured to be worn by person 22. Sensors 112 measure the orientation of helmet 36 and the reflection of low level light beams (not shown separately in FIG. 3) from at least one of the person's corneas to determine the person's line of sight, utilizing foveal spot location determination module 110.

To adjust displayed first image portion 118 and displayed second image portion 28 in accordance with movements of the line of sight 23 of person 22, the person's line of sight is determined utilizing eye tracking sensors 112 and foveal spot location determination module 110. A vacancy is generated in the displayed first image portion 118 corresponding to a foveal vision field 116 around the determined line of sight 23. First image portion 118 is displayed on first display screen 10 with the generated vacancy. A higher resolution second image portion 28 is generated that corresponds to the generated vacancy, so that the second image portion 28 "fills-in" for the generated vacancy. The higher resolution second portion 28 is displayed on the second image screen 26 so that person 22 perceives the displayed second image portion as fusing at its boundaries with the displayed first image portion 118. As processor 104 tracks eye movements of person 22 and alters first image portion 118 and second image portion 28 in accordance with the tracked eye movements, the result appears to person 22 as a merged image having tiered resolution.

Some configurations further enhance the image presented to the operator by providing a stereoscopic image. For example, different displays 26 can be provided to present stereoscopic foveal images for each eye while display 10 presents a non-stereoscopic peripheral background to both eyes. Each display 26 presents imagery that is angularly displaced from the imagery presented to the other eye (as would be the case with a time delay in the presentation of synthetic aperture radar imagery, for example). It happens that human beings can resolve a binary parallax of as little as 5 seconds of arc (0.024 mrad), which is an order of magnitude better than monocular (eyechart) acuity. This form of naturally occurring "sub-pixel" resolution may be exploited to enhance the operator's ability to interpret or recognize images. In yet another configuration, separate displays 10 also are provided for each eye, such that the peripheral field also is viewed as stereoscopic.

Configurations of the present invention will thus be appreciated as providing images of a large scene at high resolution utilizing practical display technology, by emulating the visual perception strategy of the human eye. In particular, a high resolution image portion is provided at and around the operators line of sight, allowing reduced resolution to be provided elsewhere. In addition to combat displays, configurations of the present invention can be utilized in any field in which a large, highly-detailed rendering is to be viewed. Thus, the present invention will also be found useful: in many other fields, such as computer games, consumer electronic displays, and high-resolution, synoptic presentation of cartography. The invention will be found useful in the presentation of medical images, for example, in the examination of computer-aided tomography (CAT scans) at high resolution.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for displaying a video image to a person, said method comprising:
    displaying a first portion of an image in a peripheral vision field of a person;
    displaying a second portion of the image at a higher resolution than the first image portion in a foveal vision field of the person;
    adjusting the displayed first image portion and the displayed second image portion in accordance with movements of the person's line of sight over the image; and
    wherein said adjusting the displayed first image portion and the displayed second image portion comprises controlling an apparent focal distance of at least one virtual image.

2. A method in accordance with claim 1, wherein:
    said displaying a first portion of an image comprises displaying the first portion of the image on a first display screen; and
    said displaying a second portion of the image comprises displaying the high resolution portion on a second display screen comprising a beam splitter.

3. A method in accordance with claim 2, further comprising utilizing measurements of beam splitter orientation and reflection of low-level light beams from at least of the person's corneas to determine the person's line of sight.

4. A method in accordance with claim 2, wherein said displaying the high resolution portion is performed using one selected from the group consisting of headwear worn by the person and a display system having an eyepiece used by the person.

5. A method in accordance with claim 2, wherein the second portion of the image and the first portion of the image are displayed emmetropically.

6. A method in accordance with claim 2, wherein said adjusting the displayed first image portion and the displayed second image portion in accordance with movements of the person's line of sight over the image comprises:
    determining the person's line of sight;
    generating a vacancy in the displayed first image corresponding to a foveal vision field around the determined line of sight;
    displaying the first image portion with the generated vacancy on the first display screen;
    generating a higher resolution second portion of the image corresponding to the generated vacancy; and
    displaying the higher resolution second portion of the image on the second display screen so that the person perceives the displayed second image portion as fusing at its boundaries with the displayed first image portion.

7. A method in accordance with claim 1, further comprising apodizing boundaries between the first displayed image portion and the second displayed image portion.

8. An apparatus for displaying an image to a person, said apparatus comprising:
    a first display screen configured to display a first, peripheral portion of an image;
    a second display screen configured to display a second, foveal portion of an image at a higher resolution than the first peripheral image portion; wherein said first display screen and said second display screen are configured to present the first, peripheral portion of the image and the second, foveal portion of the image as a merged image having tiered resolution to the person;
    a processor configured to track eye movements of the person and alter the displayed first peripheral image portion and the displayed second foveal image portion in accordance with the tracked eye movements; and
    a collimated projector, and wherein the second display screen is configured to reflect an image projected by said collimated projector.

9. An apparatus in accordance with claim 8, wherein the first display screen is configured to display an image selected from the group of a real image and a virtual image.

10. An apparatus in accordance with claim 8, wherein the first display screen and the second display screen are configured to display emmetropic images.

11. An apparatus in accordance with claim 8, wherein said first display screen comprises a display screen selected from the group consisting of CRT display screens, backlit LCD display screens, and ground glass projector screens, and said second display screen comprises a beam splitting screen configured to be displayed in front of at least one of the person's eyes when the person is viewing said first display screen.

12. An apparatus in accordance with claim 11, wherein the beam splitting screen is configured as an ellipsoidal reflector.

13. An apparatus in accordance with claim 11, wherein the beam splitting screen is mounted on headwear configured to be worn by the person.

14. An apparatus in accordance with claim 11, wherein the beam splitting screen is configured to present an image subtending about 7.2°×9° of the person's visual field.

15. An apparatus in accordance with claim 11, wherein the first display screen has an aspect ratio of 4:5.

16. An apparatus in accordance with claim 11, wherein the first display screen has a resolution of 1,080×1,350 pixels.

17. An apparatus in accordance with claim 16, wherein resolution of 480×640 pixels.

18. An apparatus in accordance with claim 8, wherein said second display screen comprises a parabolic reflector.

19. An apparatus in accordance with claim 18, wherein the parabolic reflector is a beam splitter.

20. An apparatus for displaying a video image to a person, said apparatus configured to:
   display a first portion of an image in a peripheral vision field of a person;
   display a second portion of the image at a higher resolution than the first image portion in a foveal vision field of the person; and
   adjust the displayed first image portion and the displayed second image portion by controlling an apparent focal distance of at least one virtual image in accordance with movements of the person's line of sight over the image.

21. An apparatus in accordance with claim 20, further comprising a first display screen and a second display screen, and wherein:
   to display said first portion of an image, said apparatus is configured to display the first portion of the image on said first display screen; and
   to display a second portion of the image, said apparatus is configured to display the high resolution portion on said second display screen;
   and wherein said second display screen comprises a beam splitter.

22. An apparatus in accordance with claim 21, further comprising headwear configured to be worn on the person's head, wherein said beam splitter is mounted on the headwear, and further wherein said apparatus is configured to measure orientation of said headwear and reflection of low-level light beams from at least one of the person's corneas to determine the person's line of sight.

23. An apparatus in accordance with claim 20, wherein said apparatus is configured to match a focal distance of said second portion of the image with a focal distance of said first portion of the image.

24. An apparatus in accordance with claim 20, wherein to adjust the displayed first image portion and the displayed second image portion in accordance with movements of the person's line of sight over the image, said apparatus is configured to:
   determine the person's line of sight;
   generate a vacancy in the displayed first image corresponding to a foveal vision field around the determined line of sight;
   display the first image portion with the generated vacancy on the first display screen;
   generate a higher resolution second portion of the image corresponding to the generated vacancy; and
   display the higher resolution second portion of the image on the second display screen so that the person perceives it as fusing at its boundaries with the displayed first image portion.

25. An apparatus in accordance with claim 20, further configured to apodize boundaries between the first displayed image portion and the second displayed image portion.

26. An apparatus for displaying an image to a person, said apparatus comprising eye tracking sensors and configured to display a tiered resolution image to person, wherein the tiered image is adjusted by controlling an apparent focal distance of least one virtual image in accordance with the person's tracked eye movements.

27. An apparatus in accordance with claim 26, further comprising a processor configured to derive a full resolution image portion from a data-processed image stored in a memory.

28. An apparatus in accordance with claim 26, further comprising a plurality of displays configured to display the tiered image stereoscopically.

* * * * *